US012600639B2

(12) United States Patent
Xu et al.

(10) Patent No.: US 12,600,639 B2
(45) Date of Patent: Apr. 14, 2026

(54) FUNCTIONALIZED SILICA AEROGEL POWDER AND PREPARATION METHOD THEREOF, AEROGEL SLURRY AND PREPARATION METHOD AND USE THEREOF

(71) Applicant: SKYBOYS (HANGZHOU) TECHNOLOGY CO., LTD, Hangzhou (CN)

(72) Inventors: Xiran Xu, Hangzhou (CN); Bo Wu, Hangzhou (CN)

(73) Assignee: SKYBOYS (HANGZHOU) TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 19/181,606

(22) Filed: Apr. 17, 2025

(65) Prior Publication Data

US 2026/0062350 A1     Mar. 5, 2026

(30) Foreign Application Priority Data

Sep. 5, 2024    (CN) ......................... 202411242086.9

(51) Int. Cl.
| | |
|---|---|
| *C01B 33/158* | (2006.01) |
| *B01J 13/00* | (2006.01) |
| *C01B 33/159* | (2006.01) |
| *C01B 33/26* | (2006.01) |
| *C04B 14/10* | (2006.01) |
| *C04B 20/00* | (2006.01) |
| *C04B 20/02* | (2006.01) |
| *C04B 20/04* | (2006.01) |
| *C04B 20/10* | (2006.01) |
| *C04B 28/26* | (2006.01) |
| *C04B 40/00* | (2006.01) |
| *C04B 111/40* | (2006.01) |
| *F16L 59/00* | (2006.01) |
| C04B 103/40 | (2006.01) |
| C04B 103/50 | (2006.01) |
| C04B 103/67 | (2006.01) |

(52) U.S. Cl.
CPC ....... *C01B 33/1585* (2013.01); *B01J 13/0091* (2013.01); *C01B 33/159* (2013.01); *C01B 33/26* (2013.01); *C04B 14/104* (2013.01); *C04B 20/0036* (2013.01); *C04B 20/026* (2013.01); *C04B 20/04* (2013.01); *C04B 20/1037* (2013.01); *C04B 28/26* (2013.01); *C04B 40/0046* (2013.01); *F16L 59/00* (2013.01); *C01P 2004/13* (2013.01); *C01P 2006/32* (2013.01); *C04B 2103/408* (2013.01); *C04B 2103/50* (2013.01); *C04B 2103/67* (2013.01); *C04B 2111/40* (2013.01); *C04B 2201/30* (2013.01)

(58) Field of Classification Search
CPC ............................................. C01B 33/146–166
See application file for complete search history.

(56) References Cited

U.S. PATENT DOCUMENTS

2022/0275571 A1     9/2022  Ning et al.

FOREIGN PATENT DOCUMENTS

| CN | 105565774 A | * | 5/2016 | ......... C04B 38/0045 |
|---|---|---|---|---|
| CN | 105793303 A | | 7/2016 | |
| CN | 106366739 A | | 2/2017 | |
| CN | 109619100 A | | 4/2019 | |
| CN | 110922095 A | | 3/2020 | |
| CN | 117358164 A | | 1/2024 | |

OTHER PUBLICATIONS

Liu et al. Novel three-dimensional halloysite nanotubes/silica composite aerogels with enhanced mechanical strength and low thermal conductivity prepared at ambient pressure. J. Sol-Gel Technol. (2016) 80:651-659. (Year: 2016).*
Machine Translation of CN105565774A. May 11, 2016. (Year: 2016).*
Machine Translation of CN117358164A. Jan. 9, 2024. (Year: 2024).*
First Office Action received in corresponding Chinese Patent Application No. 202411242086.9, dated Mar. 12, 2025, 25 pages.

* cited by examiner

*Primary Examiner* — Stephen E Rieth
(74) *Attorney, Agent, or Firm* — Cooper Legal Group, LLC

(57)     ABSTRACT

The present application belongs to the field of thermal management technology, and discloses a functionalized silica aerogel powder and a preparation method thereof, an aerogel slurry and a preparation method and use thereof. A method for preparing the functionalized silica aerogel powder includes the following steps: (1) modifying halloysite nanotubes with dodecyl methacrylate and pentafluorophenyl methacrylate to obtain modified halloysite nanotubes; (2) preparing a silica sol; (3) adding the modified halloysite nanotubes into the silica sol to prepare a wet gel; and (4) preparing a functionalized silica aerogel powder through the wet gel. Further, the aerogel slurry was prepared using the functionalized silica aerogel powder, and an aerogel thermal insulation blanket was prepared using the aerogel slurry. The aerogel thermal insulation blanket has low thermal conductivity, good mechanical performance, not easy to lose powder, convenient transportation, and can be suitable for thermal management in various scenarios.

8 Claims, No Drawings

FUNCTIONALIZED SILICA AEROGEL POWDER AND PREPARATION METHOD THEREOF, AEROGEL SLURRY AND PREPARATION METHOD AND USE THEREOF

CROSS-REFERENCE TO RELATED APPLICATION

The present application claims the priority and benefit of Chinese patent application serial no. 202411242086.9, filed on Sep. 5, 2024. The entirety of Chinese patent application serial no. 202411242086.9 is hereby incorporated by reference herein and made a part of this specification.

TECHNICAL FIELD

The present application belongs to the technical field of thermal management materials, and particularly relates to a functionalized silica aerogel powder and a preparation method thereof, an aerogel slurry and a preparation method and use thereof.

BACKGROUND ART

Silica aerogel is a lightweight nano-amorphous solid material, as a new super thermal-insulation material, the thermal conductivity of the silica aerogel is extremely low, far lower than the thermal conductivity of 0.25 W/m·K of static air at room temperature. The silica aerogel has an unparalleled thermal insulation effect compared to other materials and is known as a super thermal insulation material due to its low density, waterproof and flame-retardant properties, environmental friendliness, corrosion resistance, resistance to aging, and long service life.

Slurry forming process is a new solution to composite the silica aerogel with a fiber material by mixing pre-prepared nano-powder with a solvent to make a slurry and injecting the slurry into a pre-prepared fiber fabric and then removing the solvent from the pre-prepared fiber fabric to form a fiber-reinforced aerogel composite. Benefiting from the advantages of the low cost of the slurry forming process and good compatibility between the slurry and the fibers, an aerogel composite thermal insulation blanket with both flexibility and excellent mechanical properties can be prepared by compositing the slurry with various fiber felts, such as glass fiber felts, quartz fiber felts, alumina fiber felts, mullite fiber felts, etc.

There are still some problems such as high thermal conductivity, low mechanical strength, and low resistance to high temperature in the aerogel composite thermal insulation blankets prepared by the existing slurry forming process. Therefore, it is of significant practical significance to realize the rapid and low-cost preparation of silica aerogel composite thermal insulation blankets and endow the material with flexible, good mechanical properties, excellent thermal insulation properties and high-temperature resistance.

SUMMARY

In order to solve the above-mentioned technical problems, a functionalized silica aerogel powder with a better hydrophobic effect and a larger contact angle is developed, and at the same time, an aerogel slurry with a lower thermal conductivity is developed; after being combined with a fiber felt, an aerogel thermal insulation blanket to be prepared can satisfy requirements of a low thermal conductivity, a high mechanical strength and can better solve a problem of powder loss; and the present application provides a functionalized silica aerogel powder and a preparation method thereof, an aerogel slurry and a preparation method and use thereof.

In a first aspect, the present application provides a method for preparing a functionalized silica gerogel powder, including the following steps:

S1, adding dodecyl methacrylate, pentafluorophenyl methacrylate, an organic solvent, and halloysite nanotubes to a reaction vessel, adding an initiator to the reaction vessel to obtain a reaction system, controlling a reaction temperature of the reaction system to 70-80° C. and reacting for 4-8 h under stirring, then cooling and filtering the reaction system to obtain a filter residue, washing and drying the filter residue to prepare copolymer-modified halloysite nanotubes for use;

S2, mixing a silicon source, deionized water, absolute ethanol, and n-hexane under stirring at room temperature to prepare a silicon source precursor solution;

S3, adding an acid catalyst to the silicon source precursor solution prepared in the step S2 to adjust a pH value of the silicon source precursor solution to 2-3, and performing a hydrolysis reaction under heating by a water bath to prepare a silica sol;

S4, adding an alkaline catalyst to the silica sol prepared in the step S3 to adjust a pH value of the silica sol to 6-7, adding the copolymer-modified halloysite nanotubes prepared in the step S1, stirring and sonicating, then adding diphenylmethane diisocyanate and an organotin catalyst, reacting at 50-60° C. for 8-15 h, and standing to prepare a wet gel; and S5, aging the wet gel prepared in the step S4 for 10-15 h, adding a hydrophobic modifier for hydrophobic modification, drying, and ball-milling to prepare the functionalized silica aerogel powder.

Optionally, in the step S1, a weight ratio of the dodecyl methacrylate, pentafluorophenyl methacrylate, initiator, and halloysite nanotubes is (5-10):(2-3):(0.2-0.5):(50-80).

Optionally, in the step S1, the halloysite nanotubes are coupling-modified halloysite nanotubes, and a process for preparing the coupling-modified halloysite nanotubes includes the following steps: mixing the halloysite nanotubes with a urea solution, sonicating, and standing, then adding sulfuric acid, standing to obtain a first mixture, filtering the first mixture to obtain a first filter residue, and drying the first filter residue to prepare pretreated halloysite nanotubes; adding a silane coupling agent, water, and pretreated halloysite nanotubes to a reaction vessel to obtain a second mixture, adjusting a pH value of the second mixture to 9-10, reacting at 60-80° C. for 2-3 h, then adjusting the pH value of the second mixture to neutral, cooling and filtering the second mixture to obtain a second filter residue, washing and drying the second filter residue to prepare coupling-modified halloysite nanotubes.

Optionally, in the step S1, a preparation process of the pretreated halloysite nanotubes includes the following steps: mixing the halloysite nanotubes and a 20 wt % urea solution with a weight ratio of 1:(8-10), sonicating, and standing, then adding a 5 wt % sulfuric acid solution, standing to obtain the first mixture, filtering the first mixture to obtain a first filter residue, and drying the first filter residue to prepare pretreated halloysite nanotubes; wherein a weight ratio of the sulfuric acid solution to the halloysite nanotubes is 5:1.

Optionally, in the step S1, the process for preparing the coupling-modified halloysite nanotubes includes the following steps: adding the silane coupling agent, water and the pretreated halloysite nanotubes to the reaction vessel to obtain the second mixture, adjusting the pH value of the second mixture to 9-10, reacting at 60-80° C. for 2-3 h, then adjusting the pH value of the second mixture to neutral, cooling and filtering the second mixture to obtain a second filter residue, washing and drying the second filter residue to prepare the coupling-modified halloysite nanotubes; wherein a weight ratio of the silane coupling agent, water and the pretreated halloysite nanotubes is (1-1.5): 100:(9-14).

By adopting the above technical solution, urea as a polar solvent can help to open a lumen of the halloysite nanotubes. On the one hand, the thermal insulation capacity of the halloysite nanotubes can be enhanced, on the other hand, an inner surface area of the halloysite nanotubes can be increased, and at the same time, surface properties of the halloysite nanotubes can be changed through an insertion of urea molecules, and a dispersibility and reactivity of the halloysite nanotubes can be improved. Acid treatment of the halloysite nanotubes results in a removal of some of hydroxyl groups at first, but promotes rehydroxylation of a surface of the halloysite nanotubes, thereby generating more hydroxyl groups on the surface of the halloysite nanotubes and providing more reactive sites for subsequent function-alization.

Optionally, in the step S2, a weight ratio of the silicon source, deionized water, anhydrous ethanol, and n-hexane is 1:(5-10):(3-6):(1-2).

Optionally, in the step S2, the silicon source is one or more selected from a group consisting of: methyl orthosili-cate, ethyl orthosilicate, sodium silicate, isopropyl orthosili-cate, methyl trimethoxysilane, and methyl triethoxysilane.

Optionally, in the step S3, the acid catalyst is one of an oxalic acid solution, a hydrochloric acid solution, a phos-phoric acid solution, and a citric acid solution with a concentration of 0.3-0.5 wt %.

Optionally, in the step S4, the alkaline catalyst is one of an aqueous ammonia solution, a sodium carbonate solution, and a sodium bicarbonate solution with a concentration of 0.2-0.4 wt %.

Optionally, in the step S4, a weight ratio of the silica sol, the copolymer-modified halloysite nanotubes, diphenyl-methane diisocyanate, and the organotin catalyst is (20-30):(1-3):(0.5-1):0.05.

Optionally, in the step S6, the hydrophobic modifier is trimethylchlorosilane.

Optionally, in the step S6, the hydrophobic modifier is a mixed liquid of n-hexane and trimethylchlorosilane in a weight ratio of (7-12):1.

By adopting the above technical solution, when trimeth-ylchlorosilane is mixed with n-hexane for hydrophobic modification, it is possible to prevent the wet gel from reacting too violently during a hydrophobic treatment pro-cess to cause gel cracking, thereby ensuring surface prop-erties of the aerogel to be prepared.

Optionally, in the step S5, the drying adopts a cryogenic vacuum drying, with a temperature of (−60)-(−30° C.), a vacuum degree of 50-100 Pa, and a drying time of 10-30 h.

By adopting the above technical solution, in the present application, the surface of the halloysite nanotube is grafted with a copolymer of dodecyl methacrylate and pentafluoro-phenyl methacrylate through a copolymerization reaction of acrylic monomers, so that the surface of the halloysite nanotube is grafted with a pentafluorophenyl group and a dodecyl ester group, containing a fluorine element and a benzene ring, both groups with strong hydrophobicity and stability, and a long-chain alkyl structure in the dodecyl ester group being able to enhance a hydrophobic interaction between molecules, thereby reducing the heat conduction capacity. Therefore, by compounding dodecyl methacrylate and pentafluorophenyl methacrylate and performing copo-lymerization reaction to modify the surface of halloysite nanotubes, functional groups with corresponding functions can be grafted onto the surface of halloysite nanotubes, thereby preparing copolymer-modified halloysite nanotubes.

By adopting the above technical solution, the copolymer-modified halloysite nanotubes are added to the silica sol to be hydrolyzed, and the copolymer-modified halloysite nano-tubes and the silica gel can be connected via Si—O—Si bonding during an alkaline catalysis process. At the same time, the hydroxyl groups on the surface of the silica gel and the hydroxyl groups on the surface of the modified halloysite nanotubes are cross-linked and cured with the isocyanate group of diphenylmethane diisocyanate to form a three-dimensional network structure. On the one hand, it can promote the uniform distribution of the copolymer-modified halloysite nanotubes in the silica aerogel, and on the other hand, it can further improve mechanical properties, weather resistance, and hydrophobicity of a composite aerogel to be formed. In addition, in the crosslinking and curing process of diphenylmethane diisocyanate, water acts as a foaming agent to make the composite aerogel to be formed have high porosity and high specific surface area. Meanwhile, the hydrophobicity of the composite aerogel from diphenyl-methane diisocyanate as a curing agent containing fused benzene rings is stronger under a hydrophobic action of benzene rings, and the hydrophobicity of a hydrophobically-modified composite aerogel is further improved, so that a finally prepared functionalized silica aerogel powder has a better hydrophobic effect and a larger contact angle.

The halloysite nanotubes are introduced into a silica aerogel matrix material. The halloysite nanotubes have a high specific surface area, and the hydrophobic effect of the silica aerogel matrix material can be greatly improved by introducing hydrophobic groups into the surface of the halloysite nanotubes. The halloysite nanotubes have a tubu-lar structure with nanometer size and a large length-diameter ratio, so that the functionalized silica aerogel powder to be prepared has good mechanical properties and temperature resistance.

In a second aspect, the present application provides a functionalized silica aerogel powder prepared by the method described above for preparing the functionalized silica aero-gel powder.

In a third aspect, the present application provides an aerogel slurry prepared from the functionalized silica aero-gel powder described above, the aerogel slurry including the following raw materials in parts by weight: 15-45 parts of the functionalized silica aerogel powder, 35-60 parts of lightweight microspheres, 250-350 parts of an aqueous inorganic resin, 5-10 parts of a sodium-based bentonite, 4-10 parts of a wetting agent, 4-8 parts of a dispersant, 2-3 parts of a defoamer, 2-3 parts of an antibacterial agent, and 400-550 parts of water.

Optionally, the lightweight microspheres include one or more selected from a group consisting of: hollow glass microspheres, hollow silica microspheres, hollow ceramic microspheres, phenolic resin hollow microspheres; a particle size of the lightweight microspheres is 100-350 μm, and a density of the lightweight microspheres is 0.1-0.4 g/cm$^3$.

By adopting the above technical solution, the silicate in the aqueous inorganic resin with strong permeability and can be subjected to petrochemical reaction with calcium ions in the lightweight microspheres and carbon dioxide in the air to form a film, and the silicate in the aqueous inorganic resin can further be subjected to petrochemical reaction with aluminum ions in an aluminum oxide layer in the halloysite nanotubes to form a film, so as to improve the film-forming effect of the aerogel slurry on the surface of the fiber felt, and reduce the cracking and collapse of the aerogel slurry during drying, thereby reducing the occurrence of the phenomenon of powder loss and slag falling, so that the aerogel thermal insulation blanket to be prepared has a better thermal insulation effect.

Sodium-based bentonite can provide a suitable viscosity for the construction of aerogel slurry, which is beneficial to the spreading and penetration of aerogel slurry on the surface of fiber felt. Secondly, sodium-based bentonite has a good thickening effect on organic resin, which can improve the anti-sag performance of aerogel slurry, so that the coating uniformity of aerogel slurry is better. After drying, the cracking and collapse of the aerogel slurry can be reduced, and the phenomenon of powder loss can be reduced.

By adopting the above technical solution, the aerogel slurry is an aqueous slurry, and the aerogel slurry is coated on the surface of the fiber felt to form an aqueous film, which has better adhesion and leveling property to the surface of a hydrophilic fiber felt, so that the coating of the aerogel slurry is more uniform and stable and is not easy to drip and run off. During a subsequent baking process, a high-temperature treatment at 300-500° C. enables water molecules in a coating layer to be rapidly evaporated off, which is beneficial to maintaining the overall structural integrity of the coating layer and enabling the coating layer to completely cover the surface of the fiber felt so as to further improve the thermal insulation capacity. At the same time, a powder loss rate of the aerogel thermal insulation blanket can also be reduced. On the other hand, the functionalized silica aerogel powder on the surface of the coating layer is exposed. The hydrophobic groups on the surface of aerogel thermal insulation blanket make a final aerogel thermal insulation blanket have a better hydrophobic effect and larger contact angle so that the aerogel thermal insulation blanket to be prepared has low thermal conductivity and can effectively block heat transfer.

In a fourth aspect, the present application provides a method for preparing the aerogel slurry described above, including the following steps:

adding water, the dispersant, the defoamer, and a half amount of the wetting agent to a reaction vessel, stirring, adjusting a pH value of a resulting mixture to 9-9.5, adding the aqueous inorganic resin and the functionalized silica aerogel powder, controlling a temperature of the reaction vessel to 45-50° C., stirring, adding the lightweight microspheres and sodium-based bentonite, stirring, adding the antibacterial agent and the remaining wetting agent, and stirring to prepare the aerogel slurry.

In a fifth aspect, the present application provides a use of the aerogel slurry described above in a preparation of an aerogel thermal insulation blanket.

Optionally, a method for preparing the aerogel thermal insulation blanket includes the following steps: coating the aerogel slurry onto the surface of the fiber felt, standing until the fiber felt stably adsorbs the aerogel slurry, and drying the fiber felt to prepare the aerogel thermal insulation blanket.

Optionally, the fiber felt is one selected from a group consisting of: a glass fiber felt, a carbon fiber felt, a nickel fiber felt, a stainless steel fiber felt, an aluminum silicate fiber felt, a ceramic fiber felt, an alumina fiber felt, a basalt fiber felt, and a polyacrylonitrile fiber felt.

Optionally, a thickness of the fiber felt is 0.5-500 mm.

Optionally, the method for preparing the aerogel thermal insulation blanket includes the following steps:

(1) coating the aerogel slurry onto the surface of the fiber felt, standing until the fiber felt stably adsorbs the aerogel slurry, and then drying the fiber felt; during a drying process, firstly, maintaining a temperature of 100-150° C. for 1-2 h, and then maintaining a temperature of 300-500° C. for 1-2 h, so as to prepare a pretreated aerogel thermal insulation blanket;

(2) erecting the pretreated aerogel thermal insulation blanket prepared in the step (1), spraying a hydrophobic modifier from top to bottom using a spray gun, drying the pretreated aerogel thermal insulation blanket at 200° C., and then repeating the spraying once and drying again to prepare the aerogel thermal insulation blanket.

Optionally, the hydrophobic modifier is trimethylchlorosilane.

Optionally, an adsorption amount of the aerogel slurry on the surface of the fiber felt is 0.5-50 kg/m².

In summary, the present application includes at least one of the following technical effects:

1. In the present application, the copolymer-modified halloysite nanotubes are added to the silica sol to be hydrolyzed to prepare the composite aerogel, and the composite aerogel having a three-dimensional network structure, a high porosity, a high specific surface area and hydrophobic groups such as pentafluorophenyl ester groups grafted on the surface is obtained under the crosslinking action of diphenylmethane diisocyanate, and the functionalized silica aerogel powder prepared on this basis has a strong hydrophobic effect. The present application further prepares the aerogel slurry with the above functionalized silica aerogel powder and coats the aerogel slurry onto the surface of the fiber felt to prepare the aerogel thermal insulation blanket. The aerogel thermal insulation blanket prepared in the present application has a low thermal conductivity and can effectively block heat transfer. The aerogel thermal insulation blanket prepared in the present application has good temperature resistance and good mechanical properties and can be adapted to thermal insulation applications in a variety of scenes.

2. The functional silica aerogel powder, aerogel slurry and aerogel thermal insulation blanket provided in the present application have the following characteristics: the price of raw materials is low, the preparation process is simple and easy to operate, and the cost of production is low, which are conducive to industrial production and application, and have important practical significance for the development of related industries.

DETAILED DESCRIPTION

The present application provides a method for preparing a functional silica aerogel powder, including the following steps:

S1, adding dodecyl methacrylate, pentafluorophenyl methacrylate, an organic solvent, and halloysite nanotubes to a reaction vessel, adding an initiator to the reaction vessel to obtain a reaction system, controlling a reaction temperature of the reaction system to 70-80° C. and reacting for 4-8 h under stirring, then cooling and filtering the reaction system to obtain a filter residue, washing and drying the filter residue to prepare copolymer-modified halloysite nanotubes for use;

S2, mixing a silicon source, deionized water, absolute ethanol, and n-hexane under stirring at room temperature to prepare a silicon source precursor solution;

S3, adding an acid catalyst to the silicon source precursor solution prepared in the step S2 to adjust a pH value of the silicon source precursor solution to 2-3, and performing a hydrolysis reaction under heating by a water bath to prepare a silica sol;

S4, adding an alkaline catalyst to the silica sol prepared in the step S3 to adjust a pH value of the silica sol to 6-7, adding the copolymer-modified halloysite nanotubes prepared in the step S1, stirring and sonicating, adding diphenylmethane diisocyanate and an organotin catalyst, reacting at 50-60° C. for 8-15 h, and standing to prepare a wet gel; and S5, aging the wet gel prepared in the step S4 for 10-15 h, adding a hydrophobic modifier for hydrophobic modification, drying, and ball-milling to prepare the functionalized silica aerogel powder.

The present application provides a functionalized silica aerogel powder prepared by the above method for preparing the functionalized silica aerogel powder.

The present application provides an aerogel slurry including the following raw materials in parts by weight: 15-45 parts of the functionalized silica aerogel powder, 35-60 parts of lightweight microspheres, 250-350 parts of an aqueous inorganic resin, 5-10 parts of a sodium-based bentonite, 4-10 parts of a wetting agent, 4-8 parts of a dispersant, 2-3 parts of a defoamer, 2-3 parts of an antibacterial agent, and 400-550 parts of water.

The aerogel slurry of the present application is prepared by using the following method, including the following steps:

adding water, the dispersant, the defoamer, and a half amount of the wetting agent to a reaction vessel, stirring, adjusting a pH value of a resulting mixture to 9-9.5, adding the aqueous inorganic resin and the functionalized silica aerogel powder, controlling a temperature of the reaction vessel to 45-50° C., stirring, adding the lightweight microspheres and sodium-based bentonite, stirring, adding the antibacterial agent and the remaining wetting agent, and stirring to prepare the aerogel slurry.

The aerogel slurry of the present application can be used in a field of aerogel thermal insulation blanket preparation.

A method for preparing the aerogel thermal insulation blanket includes the following steps:

coating the aerogel slurry onto a surface of a fiber felt, standing until the fiber felt stably adsorbs the aerogel slurry, and then drying the fiber felt to prepare the aerogel thermal insulation blanket.

The technical problem to be solved by the present application is that there are still some problems such as high thermal conductivity, low mechanical strength and low resistance to high temperature in the composite thermal insulation blankets prepared by the existing slurry forming process. The modified silica aerogel prepared in the present application has a three-dimensional network cross-linked structure, high porosity, high specific surface area, and hydrophobic groups such as pentafluorophenyl ester groups grafted on the surface, and the functionalized silica aerogel powder prepared on this basis has a strong hydrophobic effect. The present application further prepares the aerogel slurry with the above functionalized silica aerogel powder and coats the aerogel slurry onto the surface of the fiber felt to prepare the aerogel thermal insulation blanket. The aerogel thermal insulation blanket prepared in the present application has a low thermal conductivity and can effectively block heat transfer. The aerogel thermal insulation blanket prepared in the present application has good temperature resistance and good mechanical properties and can be adapted to thermal insulation applications in a variety of scenes.

The present application will now be described in further detail with reference to the Examples.

Preparation Example 1

The functionalized silica aerogel powder in Preparation Example 1 was prepared by a method including the following steps.

S1, 0.6 kg of dodecyl methacrylate, 0.25 kg of pentafluorophenyl methacrylate, 25 kg of an organic solvent, and 6 kg of halloysite nanotubes were added to a reaction vessel. 0.03 kg of an initiator was added to the reaction vessel to obtain a reaction system, a reaction temperature of the reaction system was controlled to 80° C., and a reaction was carried out under stirring for 6 h. Then, the reaction system was cooled and filtered to obtain a filter residue. The filter residue was washed and dried to prepare copolymer-modified halloysite nanotubes for use.

S2, 1 kg of a silicon source, 7 kg of deionized water, 5 kg of anhydrous ethanol, and 1.8 kg of n-hexane were mixed under stirring at room temperature to prepare a silicon source precursor solution.

S3, an acid catalyst was added to the silicon source precursor solution until a pH value of the silicon source precursor solution was 2-3. A hydrolysis reaction was carried out under a water bath of 70° C. for 5 h to prepare a silica sol.

S4, 26 kg of silica sol was taken and added with an alkaline catalyst to adjust a pH value of the silica sol to 6-7. Then, 2 kg of copolymer-modified halloysite nanotubes were added, stirred for 30 min, and sonicated for 10 min. 0.6 kg of diphenylmethane diisocyanate and 0.05 kg of an organotin catalyst were added for reaction at 60° C. for 12 h. After standing for 3 h, a wet gel was prepared.

S5, the wet gel to be prepared was placed in a water/absolute ethanol mixed solution with a volume ratio of 1:4 at 25° C. and an atmosphere pressure for constant temperature and pressure aging for 12 h to obtain an aged wet gel. The aged wet gel was immersed into a hydrophobic modifier for hydrophobic modification, wherein an immersion time was 24 h. Then, freeze-drying was carried out at a temperature of –50° C., a vacuum degree of 100 Pa, and a drying time of 24 h. A dried modified silica aerogel was ball-milled to a particle size of 800 mesh to prepare the functionalized silica aerogel powder.

The halloysite nanotubes used in Preparation Example 1 were coupling-modified halloysite nanotubes, and the coupling-modified halloysite nanotubes were prepared by the following steps.

(1) 6 kg of halloysite nanotubes were mixed with 60 kg of a urea solution with a concentration of 20 wt %, sonicated for 30 min, and stood for 10 h. Then, 30 kg of a sulfuric acid solution with a concentration of 5 wt % was added and stood for 3 h to obtain a mixture. The mixture was filtered to obtain a filter residue, and the filter residue was dried to prepare pretreated halloysite nanotubes.

(2) 0.6 kg of silane coupling agent, 50 kg of water, and 5 kg of pretreated halloysite nanotubes were added to a reaction vessel to obtain a mixture. A pH value of the mixture was adjusted to 9-10 for a reaction at 80° C. for 2 h. Then the pH value of the mixture was adjusted to neutral. The mixture was cooled and filtered to obtain a filter residue. The filter residue was washed and dried to prepare the coupling-modified halloysite nanotubes.

The silane coupling agent used in Preparation Example 1 was KH-570.

The dodecyl methacrylate used in Preparation Example 1 was purchased from Sigma-Aldrich Co. Ltd, CAS No. 142-90-5.

The pentafluorophenyl methacrylate used in Preparation Example 1 was purchased from TCI (Shanghai) Chemical Industry Development Co., Ltd., product code: P2289, CAS No: 13642-97-2.

The silicon source used in Preparation Example 1 was tetraethyl orthosilicate.

The acid catalyst used in Preparation Example 1 was an oxalic acid solution, and a concentration of oxalic acid in the oxalic acid solution was 0.4 wt %. The alkaline catalyst used in Preparation Example 1 was an aqueous ammonia solution and a concentration of ammonia was 0.4 wt %.

The organotin catalyst used in Preparation Example 1 was dibutyltin dilaurate.

The hydrophobic modifier in Preparation Example 1 was composed of n-hexane and trimethylchlorosilane in a weight ratio of 8:1.

Preparation Example 2

The functionalized silica aerogel powder in Preparation Example 2 was prepared by a method including the following steps:

S1, 0.5 kg of dodecyl methacrylate, 0.3 kg of pentafluorophenyl methacrylate, 25 kg of an organic solvent, and 6 kg of halloysite nanotubes were added to a reaction vessel. 0.03 kg of an initiator was added to the reaction vessel to obtain a reaction system, a reaction temperature of the reaction system was controlled to 80° C., and a reaction was carried out under stirring for 6 h. Then, the reaction system was cooled and filtered to obtain a filter residue. The filter residue was washed and dried to prepare modified halloysite nanotubes for use.

S2, 1 kg of a silicon source, 7 kg of deionized water, 5 kg of anhydrous ethanol, and 1.8 kg of n-hexane were mixed under stirring at room temperature to prepare a silicon source precursor solution.

S3, an acid catalyst was added to the silicon source precursor solution until a pH value of the silicon source precursor solution was 2-3. A hydrolysis reaction was carried out under a water bath of 70° C. for 5 h to prepare a silica sol.

S4, 26 kg of silica sol was taken and added with an alkaline catalyst to adjust a pH value of the silica sol to 6-7. Then, 1 kg of copolymer-modified halloysite nanotubes were added, stirred for 30 min, and sonicated for 10 min. 0.5 kg of diphenylmethane diisocyanate and 0.05 kg of an organotin catalyst were added for reaction at 60° C. for 12 h. After standing for 3 h, a wet gel was prepared.

S5, the wet gel to be prepared was placed in a water/absolute ethanol mixed solution with a volume ratio of 1:4 at 25° C. and an atmosphere pressure for constant temperature and pressure aging for 12 h to obtain an aged wet gel. The aged wet gel was immersed into a hydrophobic modifier for hydrophobic modification, wherein an immersion time was 24 h. Then, freeze-drying was carried out at a temperature of −50° C., a vacuum degree of 100 Pa, and a drying time of 24 h. A dried modified silica aerogel was ball-milled to a particle size of 800 mesh to prepare the functionalized silica aerogel powder.

The halloysite nanotubes used in Preparation Example 2 were coupling-modified halloysite nanotubes and were prepared in the same manner as in Preparation Example 1.

The silicon source used in Preparation Example 2 was methyl trimethoxysilane, CAS No. 1185-55-3.

The acid catalyst, the alkaline catalyst, and the organotin catalyst used in Preparation Example 2 were the same as those in Preparation Example 1.

The hydrophobic modifier in Preparation Example 2 was composed of n-hexane and trimethylchlorosilane in a weight ratio of 12:1.

Preparation Example 3

The functionalized silica aerogel powder in Preparation Example 3 was prepared by a method including the following steps:

S1, 1 kg of dodecyl methacrylate, 0.2 kg of pentafluorophenyl methacrylate, 25 kg of an organic solvent, and 6 kg of halloysite nanotubes were added to a reaction vessel. 0.03 kg of an initiator was added to the reaction vessel to obtain a reaction system, a reaction temperature of the reaction system was controlled to 80° C., and a reaction was carried out under stirring for 6 h. Then, the reaction system was cooled and filtered to obtain a filter residue. The filter residue was washed and dried to prepare copolymer-modified halloysite nanotubes for use.

S2, 1 kg of a silicon source, 7 kg of deionized water, 5 kg of anhydrous ethanol, and 1.8 kg of n-hexane were mixed under stirring at room temperature to prepare a silicon source precursor solution.

S3, an acid catalyst was added to the silicon source precursor solution until a pH value of the silicon source precursor solution was 2-3. A hydrolysis reaction was carried out under a water bath of 70° C. for 5 h to prepare a silica sol.

S4, 26 kg of silica sol was taken and added with an alkaline catalyst to adjust a pH value of the silica sol to 6-7. Then, 3 kg of copolymer-modified halloysite nanotubes were added, stirred for 30 min, and sonicated for 10 min. 1 kg of diphenylmethane diisocyanate and 0.05 kg of an organotin catalyst were added for reaction at 60° C. for 12 h. After standing for 3 h, a wet gel was prepared.

S5, the wet gel to be prepared was placed in a water/absolute ethanol mixed solution with a volume ratio of 1:4 at 25° C. and an atmosphere pressure for constant temperature and pressure aging for 12 h to obtain an aged wet gel. The aged wet gel was immersed into a hydrophobic modifier for hydrophobic modification, wherein an immersion time was 24 h. Then, freeze-drying was carried out at a temperature of −50° C., a vacuum degree of 100 Pa, and a drying time of 24 h. A dried modified silica aerogel was ball-milled to a particle size of 800 mesh to prepare the functionalized silica aerogel powder.

The halloysite nanotubes used in Preparation Example 3 were coupling-modified halloysite nanotubes. A preparation process of the coupling-modified halloysite nanotubes was essentially the same as Preparation Example 1, except that KH-550 was used as the silane coupling agent.

The silicon source used in Preparation Example 3 was sodium silicate.

The acid catalyst, the alkaline catalyst, and the organotin catalyst used in Preparation Example 3 were the same as those in Preparation Example 1.

The hydrophobic modifier in Preparation Example 3 was composed of n-hexane and trimethylchlorosilane in a weight ratio of 7:1.

Preparation Example 4

Preparation Example 4 was essentially the same as Preparation Example 1, with the difference that: the coupling-modified halloysite nanotubes used in the Step S2 in Preparation Example 4 were not subjected to a pretreatment of the urea solution and the sulfuric acid solution prior to the reaction using the coupling agent.

Preparation Comparative Example 1

Preparation Comparative Example 1 was essentially the same as Preparation Example 1, with the difference that: in the Step S1 of Preparation Comparative Example 1, pentafluorophenyl methacrylate was replaced with an equivalent amount of tetrafluoroethyl methacrylate.

The step S1 in Preparation Comparative Example 1 was changed to:

S1, 0.6 kg of dodecyl methacrylate, 0.25 kg of tetrafluoroethyl methacrylate, 25 kg of an organic solvent, and 6 kg of halloysite nanotubes were added to a reaction vessel. 0.03 kg of an initiator was added to the reaction vessel to obtain a reaction system, and a reaction temperature of the reaction system was controlled to 80° C., and a reaction was carried out under stirring for 6 h. Then, the reaction system was cooled and filtered to obtain a filter residue. The filter residue was washed and dried to prepare copolymer-modified halloysite nanotubes for use.

Preparation Comparative Example 2

Preparation Comparative Example 2 was essentially the same as Preparation Example 1, with the difference that: in the step S1 of Preparation Comparative Example 2, halloysite nanotubes were not modified using pentafluorophenyl methacrylate.

The step S1 in Preparation Comparative Example 2 was changed to:

S1, 0.6 kg of dodecyl methacrylate, 25 kg of an organic solvent, and 6 kg of halloysite nanotubes were added to a reaction vessel. 0.03 kg of an initiator was added to the reaction vessel to obtain a reaction system, and a reaction temperature of the reaction system was controlled to 80° C., and a reaction was carried out under stirring for 6 h. Then, the reaction system was cooled and filtered to obtain a filter residue. The filter residue was washed and dried to prepare copolymer-modified halloysite nanotubes for use.

Preparation Comparative Example 3

Preparation Comparative Example 3 was essentially the same as Preparation Example 1, with the difference that: in the Step S1 of Preparation Comparative Example 3, dodecyl methacrylate was replaced with an equivalent amount of n-butyl methacrylate.

The step S1 in Preparation Comparative Example 3 was changed to:

S1, 0.6 kg of n-butyl methacrylate, 0.25 kg of pentafluorophenyl methacrylate, 25 kg of an organic solvent, and 6 kg of halloysite nanotubes were added to a reaction vessel. 0.03 kg of an initiator was added to the reaction vessel to obtain a reaction system, and a reaction temperature of the reaction system was controlled to 80° C., and a reaction was carried out under stirring for 6 h. Then, the reaction system was cooled and filtered to obtain a filter residue. The filter residue was washed and dried to prepare copolymer-modified halloysite nanotubes for use.

Preparation Comparative Example 4

Preparation Comparative Example 4 was essentially the same as Preparation Example 1, with the difference that: in the step S1 of Preparation Comparative Example 4, halloysite nanotubes were not modified using dodecyl methacrylate.

The step S1 in Preparation Comparative Example 4 was changed to:

S1, 0.25 kg of pentafluorophenyl methacrylate, 25 kg of an organic solvent, and 6 kg of halloysite nanotubes were added to a reaction vessel. 0.03 kg of an initiator was added to the reaction vessel to obtain a reaction system, and a reaction temperature of the reaction system was controlled to 80° C., and a reaction was carried out under stirring for 6 h. Then, the reaction system was cooled and filtered to obtain a filter residue. The filter residue was washed and dried to prepare copolymer-modified halloysite nanotubes for use.

Examples 1-3

Examples 1-3 were different aerogel slurries prepared, with the difference in the proportion and amount of raw materials, and the specific details are as follows.

The aerogel slurry prepared in Example 1 included the following raw materials in parts by weight:

38 parts of the functionalized silica aerogel powder, 45 parts of lightweight microspheres, 280 parts of an aqueous inorganic resin, 8 parts of a sodium-based bentonite, 6 parts of a wetting agent, 6 parts of a dispersant, 2.5 parts of a defoamer, 2.5 parts of an antibacterial agent, and 500 parts of water.

The aerogel slurry prepared in Example 2 included the following raw materials in parts by weight:

15 parts of the functionalized silica aerogel powder, 60 parts of lightweight microspheres, 250 parts of an aqueous inorganic resin, 5 parts of a sodium-based bentonite, 10 parts of a wetting agent, 4 parts of a dispersant, 2 parts of a defoamer, 2 parts of an antibacterial agent, and 400 parts of water.

The aerogel slurry prepared in Example 3 included the following raw materials in parts by weight:

45 parts of the functionalized silica aerogel powder, 35 parts of lightweight microspheres, 350 parts of an aqueous inorganic resin, 10 parts of a sodium-based bentonite, 4 parts of a wetting agent, 8 parts of a dispersant, 3 parts of a defoamer, 3 parts of an antibacterial agent, and 550 parts of water.

The functionalized silica aerogel powders used in Examples 1-3 were all prepared in Preparation Example 1.

The lightweight microspheres used in Examples 1-3 were hollow ceramic microspheres having an average particle size of 150 μm and an average density of 0.3 g/cm$^3$.

The aqueous inorganic resin used in Examples 1-3 was lithium silicate resin, commercially available from Tianjin Builder New Materials Technology Co., Ltd, having a modulus (silica-to-alkali ratio) of 4.8±0.1, a SiO$_2$ content of 19.0-21.0 wt %, and a Li$_2$O content of 2.0-2.2 wt %.

The wetting agent used in Examples 1-3 was METO-LAT® 514 from MÜNZING Chemical, Germany.

The dispersant used in Examples 1-3 was EDAPLAN 490 from MÜNZING Chemical, Germany.

The defoamer used in Examples 1-3 was AGITAN® 299 from MÜNZING Chemical, Germany.

The antibacterial agent used in Examples 1-3 was commercial mildewcide No. 75, oxybisphenoxarsine.

The preparation process of aerogel slurry in Examples 1-3 included the following steps.

Water, the dispersant, the defoamer, and a half amount of the wetting agent were added to a reaction vessel. A resulting mixture was stirred for 5 min and a pH value of the resulting mixture was adjusted to 9-9.5. The aqueous inorganic resin and functionalized silica aerogel powder were added to the reaction vessel and a temperature of the reaction vessel was controlled to 45° C., stirred for 30 min. Lightweight microspheres and sodium-based bentonite were added the reaction vessel and stirred for 5 min. The antibacterial agent and the remaining wetting agent were added the reaction vessel and stirred for 5 min to prepare the aerogel slurry.

Examples 4-5

Example 4 was essentially the same as Example 1, with the difference that the amount of functionalized silica aerogel powder used in Example 4 was changed from 38 parts to 15 parts.

Example 5 was essentially the same as Example 1, with the difference that the amount of functionalized silica aerogel powder used in Example 5 was changed from 38 parts to 45 parts.

Examples 6-8 and Comparative Examples 1-4

Examples 6-8 and Comparative Examples 1~4 were essentially the same as Example 1 with the difference that: the functionalized silica aerogel powder used in Examples 6-8 and Comparative Examples 1~4 were different, and the details are shown in Table 1.

TABLE 1

| Aerogel slurry | Functionalized silica aerogel powder |
|---|---|
| Example 6 | Preparation Example 2 |
| Example 7 | Preparation Example 3 |
| Example 8 | Preparation Example 4 |
| Comparative Example 1 | Preparation Comparative Example 1 |
| Comparative Example 2 | Preparation Comparative Example 2 |
| Comparative Example 3 | Preparation Comparative Example 3 |
| Comparative Example 4 | Preparation Comparative Example 4 |

Comparative Example 5

Comparative Example 5 was essentially the same as Example 1, with the difference that the functionalized silica aerogel powder in the raw material in Comparative Example 5 was replaced by a commercially available silica aerogel powder, H15 fumed silica from Wacker, Germany.

Application Examples 1-8

Application Examples 1-8 were aerogel thermal insulation blankets prepared using the aerogel slurries prepared in Examples 1-8, respectively, and the aerogel slurries used in Application Examples 1-8 correspond to Examples 1-8, respectively.

The preparation method of the aerogel thermal insulation blanket in Application Examples 1-8 included the following steps.

The aerogel slurry was blade-coated onto a 5 mm thick glass fiber felt and stood until the fiber felt stably adsorbed the aerogel slurry. Then, the fiber felt was dried, during which, a temperature of the fiber felt was maintained at 150° C. for 1 h firstly, and then the temperature of the fiber felt was maintained at 200° C. for 2 h to prepare the aerogel thermal insulation blanket. An adsorption amount of the aerogel slurry on the surface of the fiber felt was controlled to be 4 kg/m$^2$.

The density of the glass fiber felts used in Application Examples 1-8 was 0.2 g/cm$^3$.

Application Example 9

Application Example 9 was essentially the same as Application Example 1, with the difference that: the preparation method of Application Example 9 included the following steps.

(1) the aerogel slurry was blade-coated onto a 5 mm thick glass fiber felt and stood until the fiber felt stably adsorbed the aerogel slurry. Then, the fiber felt was dried, during which, a temperature of the fiber felt was maintained at 150° C. for 1 h firstly, and then the temperature of the fiber felt was maintained at 200° C. for 2 h to prepare a pretreated aerogel thermal insulation blanket. An adsorption amount of the aerogel slurry on the surface of the fiber felt was controlled to be 4 kg/m$^2$.

(2) the pretreated aerogel thermal insulation blanket prepared in the step (1) was erected, a hydrophobic modifier was sprayed on the pretreated aerogel thermal insulation blanket from top to bottom using a spray gun, the pretreated aerogel thermal insulation blanket was dried at 200° C., and then repeated the spraying once and drying again to prepare the aerogel thermal insulation blanket. Wherein, the hydrophobic modifier adopted trimethylchlorosilane, with a spraying dosage of 40 g/m$^2$ per time.

Application Comparative Example 1

Application Comparative Example 1 was essentially the same as Application Example 1, with the difference that the aerogel slurry in Application Comparative Example 1 was the aerogel slurry prepared in Comparative Example 1.

Application Comparative Example 2

Application Comparative Example 2 was essentially the same as Application Example 1, with the difference that the aerogel slurry in Application Comparative Example 2 was the aerogel slurry prepared in Comparative Example 2.

Application Comparative Example 3

Application Comparative Example 3 was essentially the same as Application Example 1, with the difference that the aerogel slurry in Application Comparative Example 3 was the aerogel slurry prepared in Comparative Example 3.

Application Comparative Example 4

Application Comparative Example 4 was essentially the same as Application Example 1, with the difference that the aerogel slurry in Application Comparative Example 4 was the aerogel slurry prepared in Comparative Example 4.

Application Comparative Example 5

Application Comparative Example 5 was essentially the same as Application Example 1, with the difference that the aerogel slurry in Application Comparative Example 5 was the aerogel slurry prepared in Comparative Example 5.

Performance Testing

1. The thermal conductivities (W/(m·K)) at 25° C. of the aerogel thermal insulation blankets prepared in Application Examples 1-9 and Application Comparative Examples 1-5 were measured with reference to the standard GB/T 10295-2008 "Thermal insulation-Determination of steady-state thermal resistance and related properties-Heat flow meter apparatus", and the measurement results are shown in Table 2.

2. The compressive strength (MPa) of the aerogel thermal insulation blankets prepared in Application Examples 1-9 and Application Comparative Examples 1-5 were measured, and the measurement results are shown in Table 2.

3. The powder loss rate (%) of the aerogel thermal insulation blankets prepared in Application Examples 1-9 and Application Comparative Examples 1-5 was measured with reference to the standard GB 34336-2017 "Reinforced nanoporous aerogel products for thermal insulation", and the measurement results are shown in Table 2.

4. Burn-through resistance test of aerogel thermal insulation blankets: using a NexGen oil burner, at a temperature of 1009-1036° C., two aerogel thermal insulation blankets on the left and right of each application example were taken as samples, and the thickness was controlled to be 10 mm. The same side of the samples was burned for 30 min. After burning, whether the burn-through was observed, and the maximum heat flux (W/cm$^2$) and the occurrence time(s) at the position where the back surface of the left and right aerogel thermal insulation blankets was 305 mm away from the surface were measured. The burn-through resistance tests were carried out on aerogel thermal insulation blankets of Application Example 3, Application Example 5, and Application Example 9, respectively, and the measurement results are shown in Table 3. (The evaluation standard was that the maximum heat flux at the position where the back surface of the aerogel thermal insulation blanket was 305 mm away from the surface should not exceed 2.27 W/cm$^2$)

TABLE 2

| | Thermal Conductivity W/(m · K) | Compressive Strength (MPa) | Powder loss rate (%) |
|---|---|---|---|
| Application Example 1 | 0.015 | 3.3 | 0.37 |
| Application Example 2 | 0.021 | 2.8 | 0.42 |
| Application Example 3 | 0.019 | 2.9 | 0.44 |
| Application Example 4 | 0.018 | 3.1 | 0.39 |
| Application Example 5 | 0.015 | 3.3 | 0.34 |
| Application Example 6 | 0.024 | 2.8 | 0.51 |
| Application Example 7 | 0.019 | 2.6 | 0.47 |
| Application Example 8 | 0.022 | 3.0 | 0.66 |
| Application Example 9 | 0.014 | 3.3 | 0.32 |
| Application Comparative Example 1 | 0.073 | 3.1 | 1.04 |
| Application Comparative Example 2 | 0.094 | 3.0 | 1.22 |
| Application Comparative Example 3 | 0.048 | 2.9 | 0.78 |
| Application Comparative Example 4 | 0.055 | 2.3 | 0.93 |
| Application Comparative Example 5 | 0.089 | 2.2 | 1.50 |

TABLE 3

| | Whether there is burn-through and the occurrence time | Maximum heat flux (W/cm$^2$) and occurrence time (s) | |
|---|---|---|---|
| | | Left Sample | Right Sample |
| Application Example 3 | No burn-through | 0.40/230 | 0.34/229 |
| Application Example 5 | No burn-through | 0.39/225 | 0.37/212 |
| Application Example 9 | No burn-through | 0.38/237 | 0.30/238 |

From the analysis of the data in Table 2, it can be seen that the thermal conductivity of the aerogel thermal insulation blanket prepared in the present application at 25° C. was as low as 0.014 W/(m·K), and it can be seen therefrom that the aerogel thermal insulation blanket prepared in the present application exhibits an extremely low thermal conductivity and can effectively block heat transfer. By comparing Application Example 1 with Application Comparative Examples 1 and 2, it can be seen that the thermal conductivity of the aerogel thermal insulation blanket prepared by using tetrafluoroethyl methacrylate instead of pentafluorophenyl methacrylate was greatly increased, the thermal insulation capacity was obviously weakened, and the powder loss rate was also obviously increased. It can be seen that pentafluorophenyl methacrylate has an obvious effect on controlling the hydrophobicity of the functionalized silica aerogel powder and the aerogel thermal insulation blanket, thereby facilitating the improvement of the thermal insulation capacity of the aerogel thermal insulation blanket and the rapid removal of the moisture in the aerogel thermal insulation blanket coating layer during baking, maintaining the structural integrity of the aerogel thermal insulation blanket, and reducing the occurrence of powder loss. As can be seen by comparing Application Example 1 with Application Comparative Examples 3 and 4, the use of a long-chain alkyl methacrylate can achieve a certain degree of improvement in the hydrophobicity of the functionalized silica aerogel powder, but the effect of the improvement in the hydrophobicity of the functionalized silica aerogel powder was lower than that of pentafluorophenyl methacrylate.

As can be seen from the analysis of the data in Table 3, the aerogel thermal insulation blankets produced in the present application have excellent heat resistance, thermal insulation, and fireproof, and can be used in various fireproof facilities, thermal insulation facilities, or various fireproof scenarios. In addition, the aerogel thermal insulation blankets produced in the present application have high mechanical strength, and low powder loss, and can be used in a variety of insulation scenarios.

The foregoing is a preferred embodiment of the present application and is not to be construed as limiting the scope of the present application. Any equivalent changes made based on the structure, shape, and principle of the present application should fall within the scope of the present application.

What is claimed is:

1. A method for preparing a functionalized silica aerogel powder, comprising the following steps:

S1, adding dodecyl methacrylate, pentafluorophenyl methacrylate, an organic solvent, and halloysite nanotubes to a reaction vessel, adding an initiator to the reaction vessel to obtain a reaction system, controlling a reaction temperature of the reaction system to 70-80° C. and reacting for 4-8 h under stirring, then cooling and filtering the reaction system to obtain a filter residue, washing and drying the filter residue to prepare copolymer-modified halloysite nanotubes;

S2, mixing a silicon source, deionized water, absolute ethanol, and n-hexane under stirring at room temperature to prepare a silicon source precursor solution;

S3, adding an acid catalyst to the silicon source precursor solution prepared in the step S2 to adjust a pH value of the silicon source precursor solution to 2-3, and performing a hydrolysis reaction under heating by a water bath to prepare a silica sol;

S4, adding an alkaline catalyst to the silica sol prepared in the step S3 to adjust a pH value of the silica sol to 6-7, adding the copolymer-modified halloysite nanotubes prepared in the step S1, stirring and sonicating, then adding diphenylmethane diisocyanate and an organotin catalyst, reacting at 50-60° C. for 8-15 h, and standing to prepare a wet gel; and S5, aging the wet gel prepared in the step S4 for 10-15 h, adding a hydrophobic modifier for hydrophobic modification, drying, and ball-milling to prepare the functionalized silica aerogel powder.

2. The method for preparing the functionalized silica aerogel powder according to claim 1, wherein in the step S1, the halloysite nanotubes are coupling-modified halloysite nanotubes, and a process for preparing the coupling-modified halloysite nanotubes comprises the following steps: mixing the halloysite nanotubes with a urea solution, sonicating, and standing, then adding sulfuric acid, standing to obtain a first mixture, filtering the first mixture to obtain a first filter residue, and drying the first filter residue to prepare pretreated halloysite nanotubes; adding a silane coupling agent, water, and the pretreated halloysite nanotubes to a second reaction vessel to obtain a second mixture, adjusting a pH value of the second mixture to 9-10, reacting at 60-80°

C. for 2-3 h, then adjusting the pH value of the second mixture to neutral, cooling and filtering the second mixture to obtain a second filter residue, washing and drying the second filter residue to prepare the coupling-modified halloysite nanotubes.

3. The method for preparing the functionalized silica aerogel powder according to claim 1, wherein in the step S3, the acid catalyst is one of an oxalic acid solution, a hydrochloric acid solution, a phosphoric acid solution or a citric acid solution with a concentration of 0.3-0.5 wt %, and in the step S4, the alkaline catalyst is one of an aqueous ammonia solution, a sodium carbonate solution or a sodium bicarbonate solution with a concentration of 0.2-0.4 wt %.

4. The method for preparing the functionalized silica aerogel powder according to claim 1, wherein in the step S5, the hydrophobic modifier is trimethylchlorosilane.

5. A functionalized silica aerogel powder prepared by the method for preparing the functionalized silica aerogel powder according to claim 1.

6. An aerogel slurry prepared from the functionalized silica aerogel powder according to claim 5, wherein the aerogel slurry comprises the following raw materials in parts by weight: 15-45 parts of the functionalized silica aerogel powder, 35-60 parts of lightweight microspheres, 250-350 parts of an aqueous inorganic resin, 5-10 parts of a sodium-based bentonite, 4-10 parts of a wetting agent, 4-8 parts of a dispersant, 2-3 parts of a defoamer, 2-3 parts of an antibacterial agent, and 400-550 parts of water.

7. A method for preparing the aerogel slurry according to claim 6, comprising the following steps:

adding the water, the dispersant, the defoamer, and a half amount of the wetting agent to a third reaction vessel, stirring, adjusting a pH value of a resulting mixture to 9-9.5, adding the aqueous inorganic resin and the functionalized silica aerogel powder, controlling a temperature of the third reaction vessel to 45-50° C., stirring, adding the lightweight microspheres and the sodium-based bentonite, stirring, adding the antibacterial agent and a remaining portion of the wetting agent, and stirring to prepare the aerogel slurry.

8. A method for preparing an aerogel thermal insulation blanket comprising the following steps:

coating the aerogel slurry according to claim 6 onto a surface of a fiber felt, standing until the fiber felt stably adsorbs the aerogel slurry, and then drying the fiber felt to prepare the aerogel thermal insulation blanket;

the fiber felt is one selected from a group consisting of: a glass fiber felt, a carbon fiber felt, a nickel fiber felt, a stainless steel fiber felt, an aluminum silicate fiber felt, a ceramic fiber felt, an alumina fiber felt, a basalt fiber felt, and a polyacrylonitrile fiber felt; and a thickness of the fiber felt is 0.5-500 mm; and an adsorption amount of the aerogel slurry on the surface of the fiber felt is 0.5-50 kg/m$^2$.

* * * * *